(12) United States Patent
Gearhart et al.

(10) Patent No.: US 8,141,126 B2
(45) Date of Patent: Mar. 20, 2012

(54) SELECTIVE IPSEC SECURITY ASSOCIATION RECOVERY

(75) Inventors: Curtis M. Gearhart, Raleigh, NC (US); Christopher Meyer, Cary, NC (US); Linwood H. Overby, Jr., Raleigh, NC (US); David J. Wierbowski, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 1449 days.

(21) Appl. No.: 11/626,602

(22) Filed: Jan. 24, 2007

(65) Prior Publication Data

US 2008/0178289 A1 Jul. 24, 2008

(51) Int. Cl.
*H04L 29/14* (2006.01)
*G06F 17/30* (2006.01)
*G06F 11/07* (2006.01)
*G06F 7/04* (2006.01)

(52) U.S. Cl. .................. 726/1; 714/6.1; 714/15; 714/30
(58) Field of Classification Search .......... 726/1; 714/6, 714/15, 30
See application file for complete search history.

(56) References Cited

U.S. PATENT DOCUMENTS

| | | | | |
|---|---|---|---|---|
| 6,629,248 | B1* | 9/2003 | Stachura et al. | 713/340 |
| 6,772,376 | B1* | 8/2004 | Merkin et al. | 714/48 |
| 7,350,233 | B1* | 3/2008 | Lee et al. | 726/15 |
| 7,395,423 | B1* | 7/2008 | Dondeti et al. | 713/151 |
| 7,689,722 | B1* | 3/2010 | Timms et al. | 709/249 |
| 2001/0020275 | A1* | 9/2001 | Jari et al. | 713/201 |
| 2003/0233452 | A1 | 12/2003 | Maufer et al. | |
| 2003/0237003 | A1* | 12/2003 | Rautiainen et al. | 713/201 |
| 2004/0236991 | A1* | 11/2004 | Brundridge et al. | 714/25 |
| 2006/0002388 | A1* | 1/2006 | Grebus et al. | 370/389 |
| 2006/0143501 | A1* | 6/2006 | Tormasov et al. | 714/5 |
| 2006/0153064 | A1* | 7/2006 | Caballero-McCann et al. | 370/216 |
| 2007/0277232 | A1* | 11/2007 | Cates et al. | 726/6 |
| 2008/0046971 | A1* | 2/2008 | Swander | 726/3 |
| 2008/0155677 | A1* | 6/2008 | Hossain et al. | 726/15 |

FOREIGN PATENT DOCUMENTS

GB 2367222 A 3/2002

(Continued)

OTHER PUBLICATIONS

Huang, G. et al. "A Traffic-Based Method of Detecting Dead Internet Key Exchange (IKE) Peers", RFC 3706, Feb. 2004.*

(Continued)

*Primary Examiner* — Michael Simitoski
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to IPsec SA recovery and provide a novel and non-obvious method, system and computer program product for selective IPsec SA recovery from security enforcement point outages. In one embodiment of the invention, a security enforcement point outage recovery method can be provided. The method can include compiling a listing of SAs for a security enforcement point and monitoring the security enforcement point for an outage. Responsive to detecting an outage in the security enforcement point, the listing can be pruned to include SAs that remain contextually valid or are utilized by the peer of the security enforcement point. Thereafter, only SAs in the pruned list can be re-established.

21 Claims, 2 Drawing Sheets

FOREIGN PATENT DOCUMENTS

WO 0139538 A1 5/2001

OTHER PUBLICATIONS

Karri, Ramesh et al. "Analysis of Energy Consumed by Secure Session Negotiation Protocols in Wireless Networks", 2003.*

Kent, S. et al. "Security Architecture for the Internet Protocol", RFC 4301, Dec. 2005.*

Huang, et al., "A Traffic-Based Method of Detecting Dead Internet Key Exchange (IKE) Peers," Cisco Systems, Inc., Feb. 2004.

* cited by examiner

SELECTIVE IPSEC SECURITY ASSOCIATION RECOVERY

BACKGROUND OF THE INVENTION

1. Field of the Invention

The present invention relates to the field of network security and more particularly to automated Internet Protocol security (Ipsec) security association (SA) recovery.

2. Description of the Related Art

Internet security has increasingly become the focus of information technologists who participate in globally accessible computer networks. In particular, with the availability and affordability of broadband Internet access, even within the small enterprise, many computers and small computer networks enjoy continuous access to the Internet. Notwithstanding, continuous, high-speed access is not without its price. Specifically, those computers and computer networks which heretofore had remained disconnected from the security risks of the Internet now have become the primary target of malicious Internet crackers and script kiddies, collectively referred to as "malicious intruders".

To address the vulnerability of computing devices exposed to the global Internet, information technologists have deployed network address translation (NAT) and network port address translation (NAPT) technologies deployed as a firewall. NAT technologies map a publicly known network address to a privately known address within a private network. In this way, external intruders cannot directly access private network devices as the private network address can be shielded from the external intruder through the proxy action of NAT. The use of NAT, however, requires a one-to-one correspondence between private and public address. To economize on the cost of a single public network address (which can be expensive), a NAPT configured firewall can act similarly to NAT excepting that a single public address can map to multiple private devices which can be distinguished by unique port assignments behind the firewall.

While NAPT and NAT enable security for devices behind the firewall, NAPT and NAT can do little to secure data in transit between source and destination nodes in the Internet. To provide true, end-to-end security for data in the Internet, secure communications must be employed. The Internet Security Protocol, known in the art as "IPsec" represents a common form of secure communications for use over the Internet. In IPsec, communications between source and destination nodes in the Internet can be administered in accordance with a security association (SA). An SA can include one or more rules that define the IPsec processing that is applied to the communication. IPsec is defined in the Request for Comment (RFC) 2401 superceded by RFC 4301 among other RFCs.

In IPsec, whether the transmission of a packet is denied or permitted with or without IPsec processing is determined by matching the attributes of a packet within the security rules in a security policy database (SPD). To make this determination, both the static rules of a security policy and dynamic rules negotiated as part of an Internet Key Exchange (IKE), each which refers to an SA as described in RFC 2401, can be subjected to a filtered search in the order of most specific to least specific attributes for both outgoing and incoming packets. The filtering of the attributes of a packet within the security rules can be based upon the source and destination address for the paired nodes engaging in secured communications.

IPsec SA endpoints typically are disposed within a security enforcement point such as a virtual private network (VPN)/firewall. Security enforcement points generally are no different than any other computing device excepting that the computing device supporting a security enforcement point hosts logic including program code enabled to support security services such as IPsec SA endpoint management. Like other computing devices, then, IPsec SA endpoints are susceptible to power outages, network communications faults, hardware failures and disabling crashes of the operating system for the computing device (collectively referred to as "outages").

To account for outages in a security enforcement point supporting an IPsec SA endpoint, two important technologies have been deployed: dead peer detection (DPD) as described in RFC 3706 and failure recovery of network secure communications as described in U.S. Patent Publication No. 20020095496 by Mark L. Antes, James R. Godwin, David A. Herr, Linwood H. Overby, Jr. and David J. Wierbowski. When combined these technologies can detect an outage, identify all established SAs for the security enforcement point, and re-establish every one of the SAs. It will be noted by the skilled artisan, however, that when an IPsec security enforcement point recovers large quantities of IPsec SAs during recovery, undesirable processing overhead and network latencies can arise.

BRIEF SUMMARY OF THE INVENTION

Embodiments of the present invention address deficiencies of the art in respect to IPsec SA recovery and provide a novel and non-obvious method, system and computer program product for selective IPsec SA recovery from security enforcement point outages. In one embodiment of the invention, a security enforcement point outage recovery method can be provided. The method can include compiling a listing of SAs for a security enforcement point and monitoring the security enforcement point for an outage. Responsive to detecting an outage in the security enforcement point, the listing can be pruned to include SAs that remain contextually valid. Thereafter, only SAs in the pruned list can be re-established.

In another embodiment of the invention, a security enforcement point outage recovery data processing system can be provided. The system can include a security enforcement point, an IPsec endpoint disposed in the security enforcement point and selective recovery logic coupled to the security enforcement point. A security association (SA) recovery database further can be coupled to the selective recovery logic, and outage detection logic can be coupled to the security enforcement point and the selective recovery logic. The outage detection logic can include program code enabled to detect an outage in the security enforcement point. The selective recovery logic in turn can include program code enabled to selectively re-establish only contextually valid SAs listed in the SA recovery database for the security enforcement point responsive to an outage detected in the security enforcement point.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for selective IPsec SA recovery from security enforcement point outages. In accordance with an embodiment of the present invention, information for the established IPsec SAs for a host security enforcement point can be added as entries to a listing of SAs in an SA recovery database. Thereafter, the host security enforcement point can be monitored for an outage. In response to detecting an outage in the host security enforcement point, the listing can be pruned to include only those SAs that are likely to remain contextually valid for the host security enforcement point. Once the listing has been pruned, the SAs corresponding to the remaining entries in the listing can be re-established according to the information stored in each entry.

Figure 1:
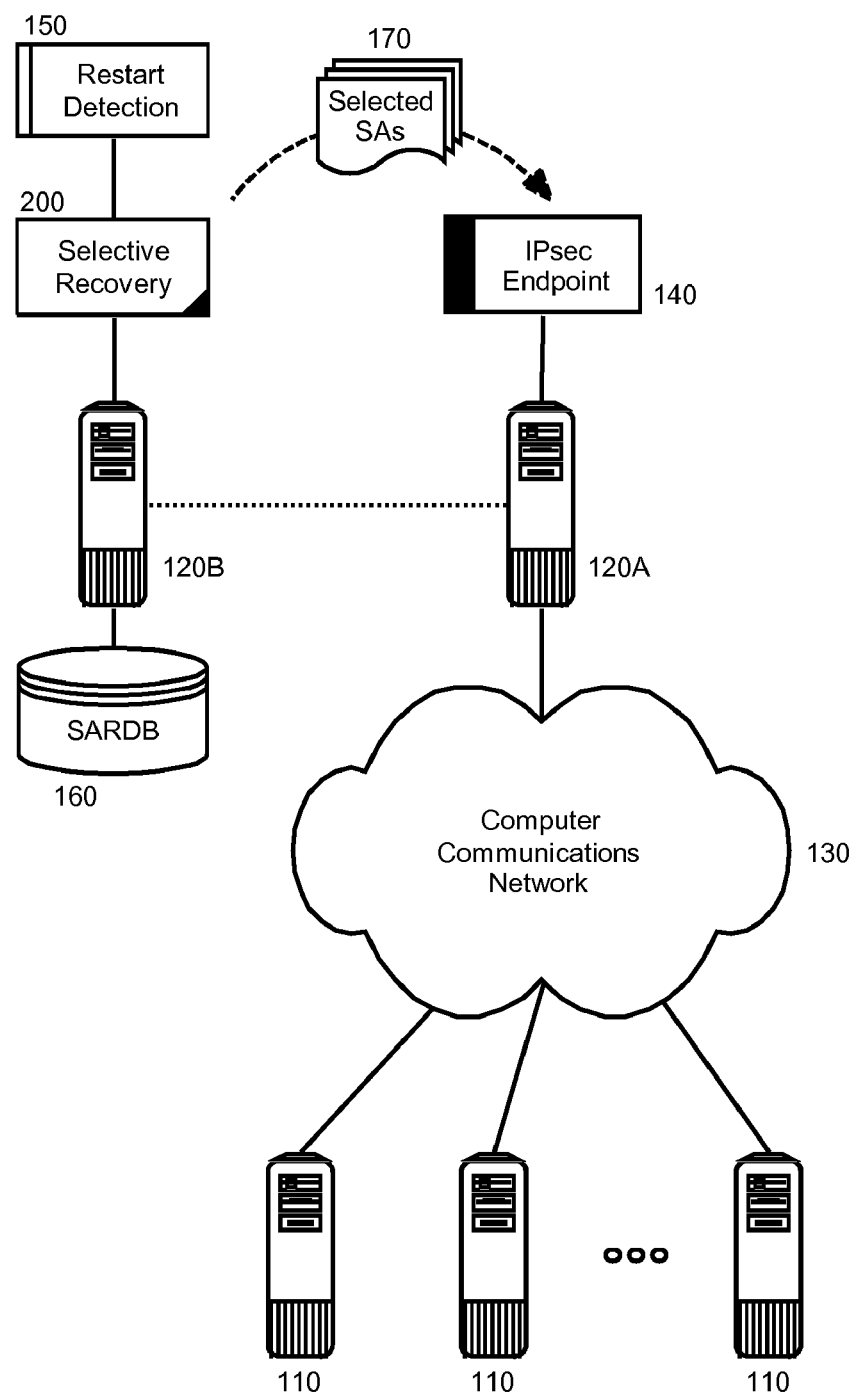
FIG. 1 is a schematic illustration of a network security architecture configured for selective IPsec SA recovery from security enforcement point outages; and, FIG. 2 is a flow chart illustrating a process for selective IPsec SA recovery from security enforcement point outages.

In further illustration, FIG. 1 is a schematic illustration of a network security architecture configured for selective IPsec SA recovery from security enforcement point outages. The system can include a security enforcement point 120A communicatively coupled to one or more computing peers 110 over a computer communications network 130. To support security services with the computing peers 110, including IPsec-based secure communications, the security enforcement point 120A can include an IPsec endpoint 140.

In accordance with an embodiment of the present invention, an SA recovery database 160 can be coupled to the security enforcement point 120A along with outage detection logic 150 and selective recovery logic 200. Notably, any combination of the outage detection logic 150, selective recovery logic 200 and SA recovery database 160 can be supported by a separate host computing platform 120B, or any combination of the outage detection logic 150, selective recovery logic 200 and SA recovery database 160 can be supported by the security enforcement point 120A itself. In either circumstance, the SA recovery database 160 can store entries for each SA established in the IPsec endpoint 140.

Each of the entries for a corresponding SA minimally can include information requisite for establishing a like SA in the event of an outage. For instance, the information can include SA identifying information, control information, SA re-establishment data, and optionally, a pre-constructed delete message. The entries in the listing of SAs for the SA recovery database 160 can vary by the stage of SA negotiation. The following table expresses exemplary record fields for an entry in the SA recovery database 160:

| Field | Phase 1 SA | Phase 2 SA |
|---|---|---|
| SA Identifying Information | icookie rcookie | Destination IP Address Protocol SPI |
| Control Information | SA Lifetime | SA Lifetime Binding Information for Parent Phase 1 SA and Related Phase 2 SAs |
| SA Re-Establishment | IDii Payload, IDir Payload Local IP Address Remote IP Address UDP Encap Port | IDci Payload IDcr Payload |
| Delete Message | Message Validity Period | Message Validity Period |
| IPsec Endpoint Identifier | Client Name | Client Name |

Returning now to FIG. 1, the outage detection logic 150 can include program code enabled to detect an outage in the security enforcement point 120A. For instance, the program code of the outage detection logic 150 can be enabled to detect an outage in an IKE daemon in the security enforcement point 120A, a TCP/IP stack in the security enforcement point 120A, or an operating system for the security enforcement point 120A, to name a few. More particularly, the program code of the outage detection logic can implement a DPD compliant framework to determine when an IKE partner no longer is available in the security enforcement point 120A.

In coordination with the restart detection logic 150, the selective recovery logic 200 can include program code enabled to respond to detecting a restart resulting from an outage by pruning entries in the SA recovery database 160 resulting in a reduced list of entries 170. The reduced list of entries 170, in turn, can be used to re-establish only those SAs deemed necessary by the program code of the selective recovery logic 200. Specifically, an SA need not be re-established merely to send a delete message. For example, entries in the SA recovery database 160 corresponding to overly aged SAs can be pruned from the list of entries. Optionally, once an entry has been pruned from the list, the delete message for the pruned entry can be executed to remove the SA from the security enforcement point 120A. As even a further pruning measure, no SAs need be re-established until the IPsec endpoint 140 receives an inbound IPsec Encapsulating Security Payload (ESP) or Authentication Header (AH) packet referencing the SA.

Figure 2:
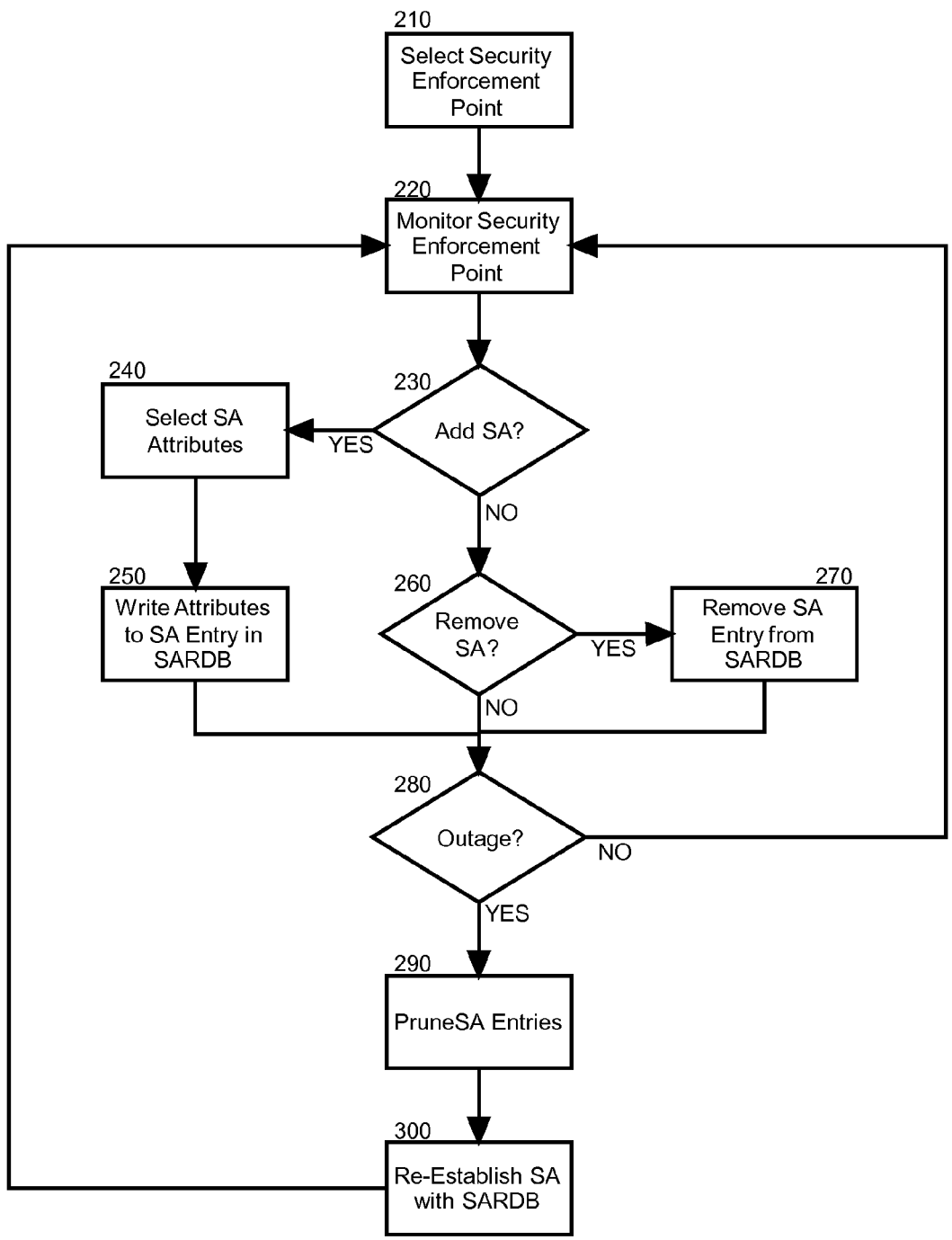

In yet further illustration, FIG. 2 is a flow chart illustrating a process for selective IPsec SA recovery from security enforcement point outages. Beginning in block 210, a security enforcement point can be selected and in block 220, the security enforcement point can be monitored in order to detect a newly negotiated SA, a newly removed SA, or an outage in the security enforcement point. In decision block 230, if an SA is newly added, in block 240 particular SA attributes can be extracted and, in block 250, those attributes can be written to a listing in an SA recovery database. Those SA attributes can include information necessary to re-establish a corresponding SA, including SA identifying information, control information, and SA re-establishment information. Also, a delete message can be pre-constructed and saved to the SA recovery database.

In decision block 260, it further can be determined whether an SA has been removed from the security enforcement point. If so, in block 270, the corresponding entry in the SA recovery database can be removed as well. Finally, in decision block 280, if a restart steming from an outage is detected in the security enforcement point, in block 290, the entries in the listing of SAs in the SA recovery database can be pruned to eliminate from consideration those SAs not contextually valid. The pruning can eliminate those SAs having a validity period that has expired as noted by corresponding entries in the SA recovery database. Thereafter, in block 300, SAs can be re-established from information in the SA recovery database for those entries remaining in the listing. However, pre-built deletion messages in the SA recover database can be used to explicitly notify corresponding IKE partners that the eliminated SAs have been deleted without having to re-establish new SAs to send the respective deletion messages.

The principle of pruning the SA recovery database to eliminate those SAs having a validity period can be applied to refreshing SAs upon receiving an ESP/AH packet from an IKE peer. In this regard, rather than automatically refreshing an SA upon receiving an ESP/AH packet from an IKE peer, the IPSec enforcement point can access a list of the SAs eligible for refreshing. The trigger for refresh can include the receipt of an inbound IPSec ESP or AH packet using the SA. If the TCP/IP stack detects an inbound IPSec packet not having an installed SA, the TCP/IP stack can notify the IKE daemon that such an IPSec packet has been received. The IKE in turn can negotiate the SA if the SA can be found in the list of SAs. Consequently, refreshes to SAs can be limited to the SAs still utilized by the remote IKE partner and unnecessary refreshes of SAs can be avoided for those SAs that will be abandoned by the remote IKE peer.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A security enforcement point outage recovery method comprising:
    compiling a listing of security associations (SAs) for a security enforcement point;
    monitoring the security enforcement point for a restart from an outage;
    responsive to detecting a restart from an outage in the security enforcement point, pruning the listing to include SAs that remain contextually valid;
    receiving a request referencing a SA; and
    re-establishing only SAs in the pruned list and only upon receiving a request referencing a SA in the pruned list.

2. The method of claim 1, further comprising:
    receiving an Encapsulating Security Payload (ESP)/Authentication Header (AH) packet from an Internet Key Exchange (IKE) peer at the security enforcement point;
    searching through the listing of SAs to determine whether the received ESP/AH packet is valid in a corresponding SA; and,
    refreshing the corresponding SA with a pre-constructed refresh message.

3. The method of claim 1, wherein compiling a listing of security associations (SAs) for a security enforcement point, comprises:
    creating an entry in an SA recovery database for each SA in the security enforcement point; and,
    writing at least an SA identifying field, a control information field and an SA re-establishment field for each entry in the SA recovery database.

4. The method of claim 3, wherein compiling a listing of security associations (SAs) for a security enforcement point, further comprises additionally pre-constructing and writing an SA delete message for each entry in the SA recovery database.

5. The method of claim 4, wherein pruning the listing to include SAs that remain contextually valid, comprises:
    inspecting a validity period for each SA in the listing to identify expired SAs;
    removing expired SAs from the listing; and,
    executing a delete message in the SA delete field for each expired SA.

6. The method of claim 1, wherein monitoring the security enforcement point for an outage, comprises deploying dead peer detection (DPD) logic to detect an outage in the security enforcement point.

7. The method of claim 1, wherein monitoring the security enforcement point for an outage, comprises monitoring the security enforcement point for an outage of an Internet Key Exchange (IKE) daemon for the security enforcement point.

8. The method of claim 1, wherein monitoring the security enforcement point for an outage, comprises monitoring the security enforcement point for an outage of a TCP/IP stack for the security enforcement point.

9. The method of claim 1, wherein monitoring the security enforcement point for an outage, comprises monitoring the security enforcement point for an outage of an operating system for the security enforcement point.

10. The method of claim 1, wherein pruning the listing to include SAs that remain contextually valid, comprises:
    inspecting a validity period for each SA in the listing to identify expired SAs; and,
    removing expired SAs from the listing.

11. A security enforcement point outage recovery data processing system comprising:
a processor configured to include:
a security enforcement point;
an Internet Protocol (IP) Security (IPsec) endpoint disposed in the security enforcement point;
selective recovery logic coupled to the security enforcement point;
a security association (SA) recovery database coupled to the selective recovery logic; and,
outage detection logic coupled to the security enforcement point and the selective recovery logic, the outage detection logic comprising program code enabled to detect an outage in the security enforcement point, the selective recovery logic comprising program code enabled to prune a listing in the SA recovery database for the security enforcement point to include only SAs that remain contextually valid, to determine that a received request references a SA and to re-establish only SAs in the pruned list and only upon receiving a request referencing a SA in the pruned list responsive to an outage detected in the security enforcement point.

12. A computer program product comprising a computer usable storage device embodying computer usable program code for security enforcement point outage recovery, the computer program product including:
computer usable program code for compiling a listing of security associations (SAs) for a security enforcement point;
computer usable program code for monitoring the security enforcement point for an outage;
computer usable program code for pruning the listing to include SAs that remain contextually valid responsive to detecting a restart from an outage in the security enforcement point;
computer usable program code for determining that a received request references a SA; and
computer usable program code for re-establishing only SAs in the pruned list and only upon receiving a request referencing a SA in the pruned list.

13. The computer program product of claim 12, further comprising:
computer usable program code for receiving an Encapsulating Security Payload (ESP)/Authentication Header (AH) packet from an Internet Key Exchange (IKE) peer at the security enforcement point;
computer usable program code for searching through the listing of SAs to determine whether the received ESP/AH packet is valid in a corresponding SA; and,
computer usable program code for refreshing the corresponding SA with a pre-constructed refresh message.

14. The computer program product of claim 12, wherein the computer usable program code for compiling a listing of security associations (SAs) for a security enforcement point, comprises:
computer usable program code for creating an entry in an SA recovery database for each SA in the security enforcement point; and,
computer usable program code for writing at least an SA identifying field, a control information field and an SA re-establishment field for each entry in the SA recovery database.

15. The computer program product of claim 14, wherein the computer usable program code for compiling a listing of security associations (SAs) for a security enforcement point, further comprises computer usable program code for additionally pre-constructing and writing an SA delete message for each entry in the SA recovery database.

16. The computer program product of claim 14, wherein the computer usable program code for pruning the listing to include SAs that remain contextually valid, comprises:
computer usable program code for inspecting a validity period for each SA in the listing to identify expired SAs;
computer usable program code for removing expired SAs from the listing; and,
computer usable program code for executing a delete message in the SA delete field for each expired SA.

17. The computer program product of claim 12, wherein the computer usable program code for monitoring the security enforcement point for an outage, comprises computer usable program code for deploying dead peer detection (DPD) logic to detect an outage in the security enforcement point.

18. The computer program product of claim 12, wherein the computer usable program code for monitoring the security enforcement point for an outage, comprises computer usable program code for monitoring the security enforcement point for an outage of an Internet Key Exchange (IKE) daemon for the security enforcement point.

19. The computer program product of claim 12, wherein the computer usable program code for monitoring the security enforcement point for an outage, comprises computer usable program code for monitoring the security enforcement point for an outage of a TCP/IP stack for the security enforcement point.

20. The computer program product of claim 12, wherein the computer usable program code for monitoring the security enforcement point for an outage, comprises computer usable program code for monitoring the security enforcement point for an outage of an operating system for the security enforcement point.

21. The computer program product of claim 12, wherein the computer usable program code for pruning the listing to include SAs that remain contextually valid, comprises:
computer usable program code for inspecting a validity period for each SA in the listing to identify expired SAs; and,
computer usable program code for removing expired SAs from the listing.

* * * * *